United States Patent
Linnenbrügger et al.

(10) Patent No.: US 7,320,656 B2
(45) Date of Patent: *Jan. 22, 2008

(54) PLATE-LINK CHAIN

(75) Inventors: André Linnenbrügger, Bühl (DE);
Oswald Kroninger, Ottersweier (DE);
Klaus Scheufele, Ottersweier (DE);
André Teubert, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/151,465

(22) Filed: May 18, 2002

(65) Prior Publication Data
US 2003/0036450 A1    Feb. 20, 2003

Related U.S. Application Data

(63) Continuation of application No. PCT/DE00/03764, filed on Oct. 23, 2000.

(30) Foreign Application Priority Data

Nov. 19, 1999    (DE) .............................. 199 55 956

(51) Int. Cl.
*F16G 13/02*    (2006.01)
(52) U.S. Cl. .................. 474/219; 474/220; 474/245
(58) Field of Classification Search ............... 474/215, 474/213, 231, 214, 244, 245, 206, 229, 228, 474/216–217, 270, 242, 219, 220; 59/15, 59/8, 91, 90; 72/203
See application file for complete search history.

(56) References Cited

U.S. PATENT DOCUMENTS

| | | | | |
|---|---|---|---|---|
| 1,743,500 A | * | 1/1930 | Sturtevant | .................. 474/215 |
| 2,154,648 A | * | 4/1939 | Weston | ........................ 474/213 |
| 3,213,699 A | * | 10/1965 | Terepin | ....................... 474/215 |
| 3,359,815 A | * | 12/1967 | Jeffrey et al. | .................. 59/90 |
| 3,581,589 A | * | 6/1971 | Resener | ....................... 474/231 |
| 4,581,001 A | * | 4/1986 | Rattunde et al. | ............. 474/214 |
| 4,764,158 A | * | 8/1988 | Honda et al. | ................ 474/212 |
| 4,911,682 A | * | 3/1990 | Ivey et al. | ................... 474/245 |
| 5,147,250 A | * | 9/1992 | Mott | .......................... 474/206 |
| 5,147,251 A | * | 9/1992 | Cole, Jr. | ..................... 474/206 |
| 5,728,021 A | * | 3/1998 | van Rooij et al. | .......... 474/229 |
| 5,792,013 A | * | 8/1998 | Heinrich et al. | ............. 474/242 |
| 6,142,903 A | * | 11/2000 | Heinrich | ..................... 474/215 |
| 6,558,281 B1 | * | 5/2003 | Greiter | ....................... 474/219 |
| 2002/0091027 A1 | * | 7/2002 | Scheufele et al. | ........... 474/229 |

FOREIGN PATENT DOCUMENTS

| | | | | |
|---|---|---|---|---|
| DE | 3027834 A1 | * | 2/1982 | |
| EP | 0741255 B1 | * | 1/1998 | |
| GB | 994633 | * | 6/1961 | |
| JP | 63-30130 A | * | 2/1988 | .................. 72/203 |

* cited by examiner

*Primary Examiner*—Marcus Charles
(74) *Attorney, Agent, or Firm*—Alfred J. Mangels

(57) ABSTRACT

A drive chain suitable for use in a continuously variable transmission of a motor vehicle, the transmission having two pairs of spaced drive members about which the chain passes to transfer torque from one drive member to the other. The chain includes a plurality of link elements that include spaced, side-by-side plate links. The plate links include openings in which pairs of parallel rocker members are disposed for relative rocking movement of at least one rocker member about its longitudinal axis. A method for stretching the chain is also disclosed, in which areas of some of the plate links are plastically deformed by stretching the chain before the chain is put to use.

24 Claims, 7 Drawing Sheets

PLATE-LINK CHAIN

CROSS-REFERENCE TO RELATED APPLICATION

This application is a continuation of International Application Serial No. PCT/DE00/03764, filed on Oct. 23, 2000, the entire contents of which are hereby incorporated by reference.

BACKGROUND OF THE INVENTION

1. Field of the Invention

The invention relates to a plate-link chain in particular for steplessly variable gear ratio, conical-disk transmissions, such as CVT transmissions, of which the individual chain links are formed from sets of plate links connected by articulation members, preferably as pairs of rocker members having rocker faces braced against each other and that are inserted into openings in the plate links. The invention also relates to a method for manufacturing such a chain.

2. Description of the Related Art

Such plate-link chains are known in the state of the art. Examples are DE 197 08 865 and the documents cited therein, EP 0 518 478 and EP 0 741 255.

In plate-link chains of those kinds, to increase the load carrying capacity after assembly of the plate links and rocker members in a straight strand and an open formation, a stretching process is carried out by applying substantial tension forces to the extended plate-link chain. In that way the contact areas of the plate links between the plate links and the rocker members of all plate links of a row are equally plastically deformed. By stretching in a straight strand there arises an equalized plastic deformation of the plate links in the contact areas, so that the plate links of one row of plate links are equally elongated over the width of the plate link or exhibit equal lengths. That has the disadvantage that when the plate-link chain is under load during operation of a steplessly adjustable transmission the chains do not exhibit optimal service life and performance capacity.

An object of the invention is to create a plate-link chain and a method for its manufacture which, relative to the plate-link chains of the state of the art particularly, withstand higher operating loads or, at equal loads, have a longer service life.

SUMMARY OF THE INVENTION

In accordance with the invention the object is achieved for the above-designated plate-link chains in that the plate-link chain is stretched when in a closed condition.

The object of the invention is also solved in that for a plate-link chain of the type described above the plate links have a different plate link inner width as a function of the chain width. That can be achieved in accordance with the invention by stretching the plate-link chain in the closed condition as a wrap-around member.

The concept of plate link inner width corresponds with the distance between the contours on which both outer rocker members lie against the plate link. That is thus a distance that is not dependent upon whether the plate link has a central opening or two openings to receive the rocker members. Furthermore, it is presented in the figure descriptions.

It is advantageous from another embodiment, however, to manufacture the plate links by different manufacturing processes, such as a stamping process or a cutting process, for example by means of a laser, or the like, and the individual plates are stretched equally or differently and are assembled together, or the assembled chain is stretched in the wrap-around condition.

It is also appropriate by a further embodiment to produce the plate links by a stamping process with equal plate link inner widths, and that are differently stretched and assembled together. The stretching can in this embodiment also be carried out on the individual plate links before assembly or in the wrap-around condition on an assembled chain.

According to a further inventive concept, the object of the invention can also be achieved by an above-designated plate-link chain in which the plate links exhibit a different degree of stretch as a function of the chain width.

That result can thereby be advantageously achieved by stretching to a different degree of stretch the plate links having the same or different plate link inner widths and assembling them together. That can also be achieved by stretching in the wrap-around condition.

According to a further inventive concept, the object of the invention can also be solved for an above-designated plate-link chain in which the plate links, as a function of the chain width, exhibit a different angle considered between the contact areas and an axis that is oblique to the chain longitudinal direction. Thereby a modulation or variation of the angle over the chain width is achieved, which permits a relatively good fit or installation of the plate links on which in operation of the chain the rocker members are partly bent.

According to a further inventive concept the object of the invention for an above-designated plate-link chain can also be solved in that the stretching load that impacts on the plate links by a stretching process has a variable angle in relation to the plate-link length direction. Thereby the plate links are stretched at different places in their contact areas and therewith strengthened in that manner, so that they exhibit sufficient strength when loaded during the operation of the chain, both in a straight strand between the conical disk pairs and in the area of the conical disk pairs.

It is particularly advantageous when the plates are individually stretched and subsequently assembled to each other. By another embodiment it is appropriate for the plate links to be stretched when in assembled condition of the closed chain, such as particularly in the wrap-around mode when arranged between two sets of conical disks of an apparatus.

The invention advantageously applies to plate-link chains in which at least one of the respective end faces of the rocker members per link associated with a conical disk carries the frictional forces between the conical disks and the plate-link chain. It can therefore be appropriate according to each application instance of the exemplary embodiments for the rocker elements to have the same length or different lengths.

The invention advantageously also applies to plate-link chains in which the plate-link chain has, in addition to rocker members, connecting pins that carry the frictional forces between conical disks and the plate-link chain.

It is particularly advantageous when the plate links adjacent to the edge of the plate-link chain are more highly elongated than those plate links arranged in the middle of the plate-link chain, or when the plate links adjacent to the edge of the plate-link chain have a larger plate link inner width than those plate links arranged in the middle of the plate-link chain.

Furthermore, it is appropriate when as a result of a stretching process contact areas of the plate links with the rocker members are in that manner plastically deformed, that an angle is formed between the contact areas and a direction oblique to the longitudinal direction of the chain.

A plate-link chain in accordance with the present invention includes a chain in which the plastic deformation of the contact areas of the plate links adjacent to the edge of the plate-link chain is greater than that for the plate links arranged at the middle of the plate-link chain. It is also appropriate for the plastic deformation of the contact areas of the plate links over the width of the chain to take on a curved-shape contact area or a shape of an $n^{th}$ degree polynomial.

Especially advantageously, the plate-link chain is stretched in a stretching process with the chain included in the conical disk gap between two pairs of conical disks, and rotation and/or torque is applied.

It is also suitable for the strain in the plate-link chain to result from a stretching process under an axial load by pressing together the conical disks and/or by pulling apart from each other the axes of the pairs of conical disks. Correspondingly, the invention also applies to apparatus for stretching a plate-link chain. Thereby, it is appropriate that the conical disks of a pair of conical disks are displaceable relative to each other or are fixed.

When stretching the plate-link chain it is appropriate for the applied torque applied during the stretching process to be substantially higher than the nominal torque that is provided during the operation of a transmission provided with a plate-link chain.

It is also appropriate for the applied torque during the stretching process to be in the range of between zero and ten times, especially three times to five times, the nominal torque during the operation of a transmission provided with a plate-link chain.

It is also appropriate for the tension in the strand of the chain during the stretching process to be higher than the nominal tension during operation of a transmission provided with a plate-link chain.

The invention also refers to a process for manufacturing a plate-link chain particularly as claimed in one of the foregoing claims. The invention also refers to a process for stretching a plate-link chain.

BRIEF DESCRIPTION OF THE DRAWINGS

Further substantive features and details of the invention are provided in the following description of embodiments that are represented in the drawings. The drawings show.

DESCRIPTION OF THE PREFERRED EMBODIMENTS

Figure 1:
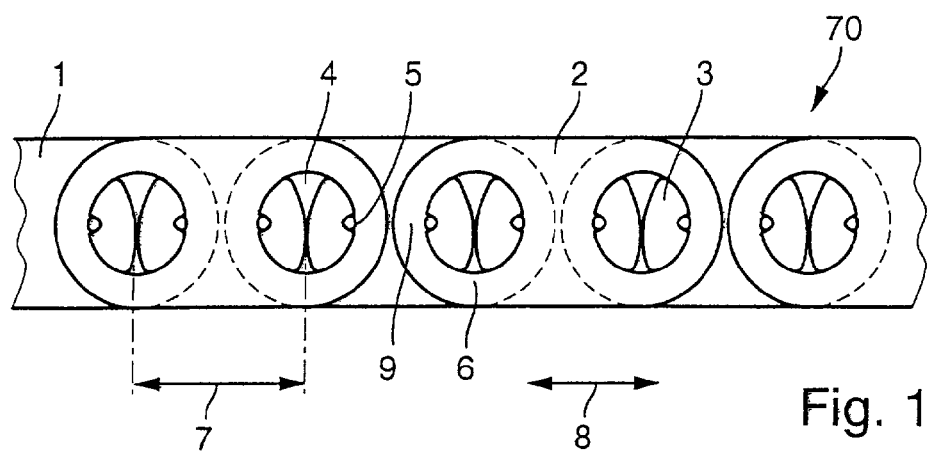
FIG. 1 is a known plate-link chain with a two-link connection in side view.
Figure 3:
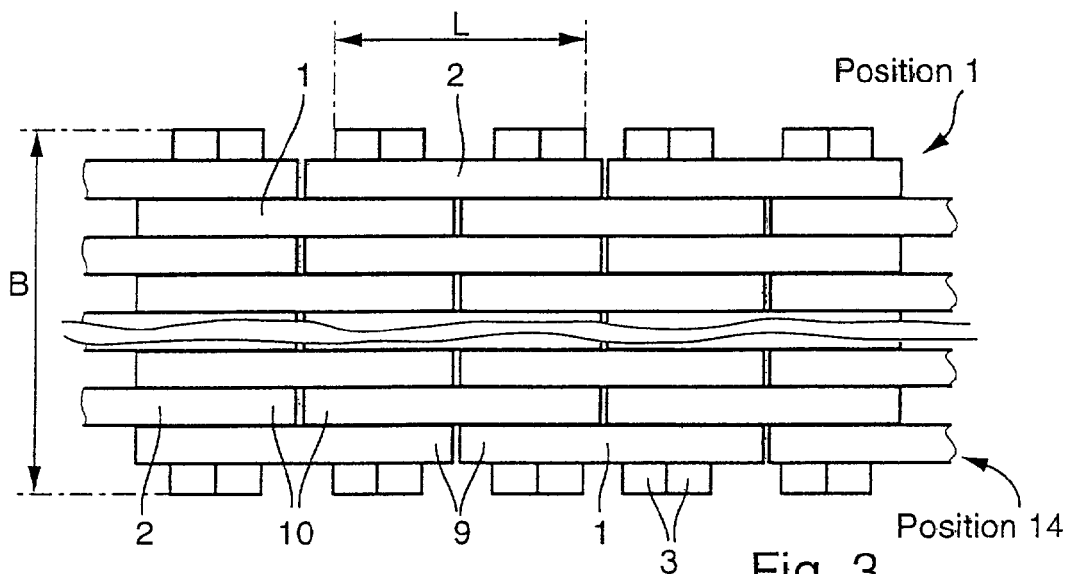
FIG. 3 is a top view of the plate-link chain in accordance with FIG. 15.

FIGS. 1 and 3 show a side view and a top view of a portion of a known plate-link chain with standard plate links 1 and 2, wherein the plate links when viewed are arranged over the width B of the plate-link chain and repeat themselves in an appropriate arrangement pattern. The plate links form link sets in series. The chain links formed by the plate links 1 and 2 are articulated by articulation members that are connected with each other, which are composed of pairs of rocker members 3, which are inserted into openings 4 of the plate links and are rotatably coupled and connected by an interlocking connection 5 with the particular associated plate links. The openings 4 can be formed in such a way that there are two openings formed per plate link for both links, or also that per plate only one opening is provided to receive rocker members for both links. The rocker members 3 have rocker faces that are directed toward each other and that can roll against each other, at least some concave, for example, which permits the link movement of adjacent chain links. The rocker faces can both be concave or one rocker face can be flat or convex and the other rocker face is concave.

Such plate-link chains can be formed in such a way that at the very least some rocker members are at least partially non-rotatably connected with their plate links associated with their chain links.

The individual links have a center-to-center spacing 7 that in general is designated the chain pitch. The magnitude of the chain pitch 7 depends on the given extent of the rocker members 3 in the direction of movement 8 of the chain, as well as on the necessary spacing between the individual openings 4. It is generally known that the chain pitch 7 is designed to remain unchanged over the full chain length, it can, however, also vary irregularly within given limits if necessary, in order to favorably influence the noise developed by the chain.

The rocker members have end faces at their side end areas with which they can frictionally engage the conical disks during operation of a transmission. At their lateral end zones, the rocker members are fitted with end surfaces allowing them to come into frictional contact with the conical disks during transmission operation. It is advantageous for both rocker members to have the same length, so that both rocker members are in contacting engagement with the conical disk. In another embodiment it is appropriate to provide rocker members having different lengths and thereby only one rocker member per link is in frictional contact with the conical disk.

It can be seen from the top view of FIG. 3 that the chain is assembled as a double-link unit, which means that in each case two radial end links 9, 10, respectively, of adjacent chain links are positioned next to each other between two pairs of rocker members 3, whereby the spacing of those links formed by pairs of rocker members is correspondingly determined.

Figure 4:
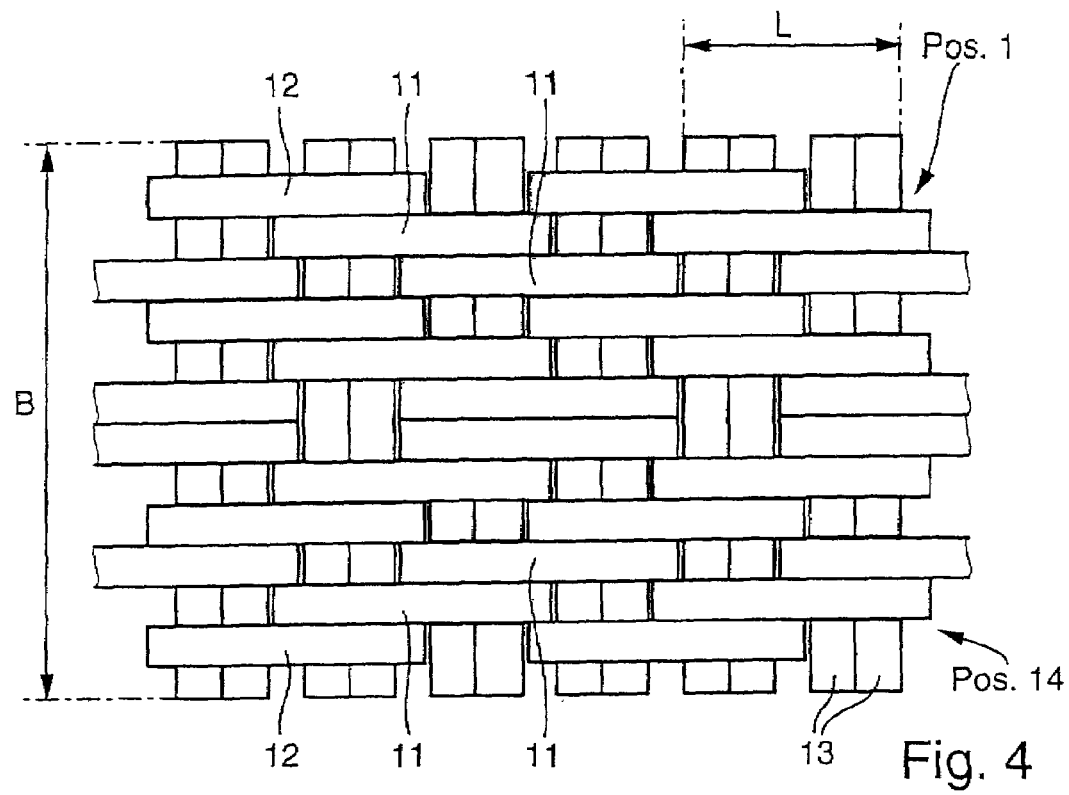
FIG. 4 is a top view corresponding with FIG. 17 to represent a three-link band of a known plate-link chain in accordance with FIG. 16.

It can be seen from the top view of FIG. 4 how known chains can be constructed as triple-link units. Here can be seen over the width of the chain the standard plate links 11 and the outer plate links 12 that are set against each other in each case and separated in the direction of chain movement, whereby on the other hand, however, the spacing between links assembled by pairs of rocker members can be reduced compared with the double-link unit in accordance with FIG. 3.

Figure 2:
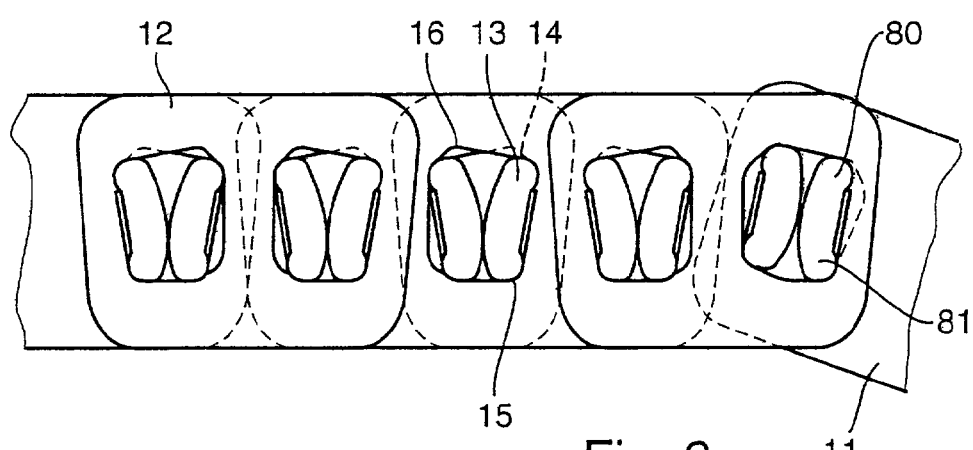
FIG. 2 is a side view of another construction of a known plate-link chain.

The top view of FIG. 4 corresponds with another known chain construction, shown in a side view in FIG. 2, having standard plate links 11 and outer plate links 12, whereby the articulation members are composed of pairs of rocker members 13. These rocker members 13 are shaped in such a way that they only lie against the plate link openings 16 at two positions 14 and 15. Between the contact positions 14 and 15 the rocker members 13 are free of the plate links 11, 12 of the chain.

Figure 5:
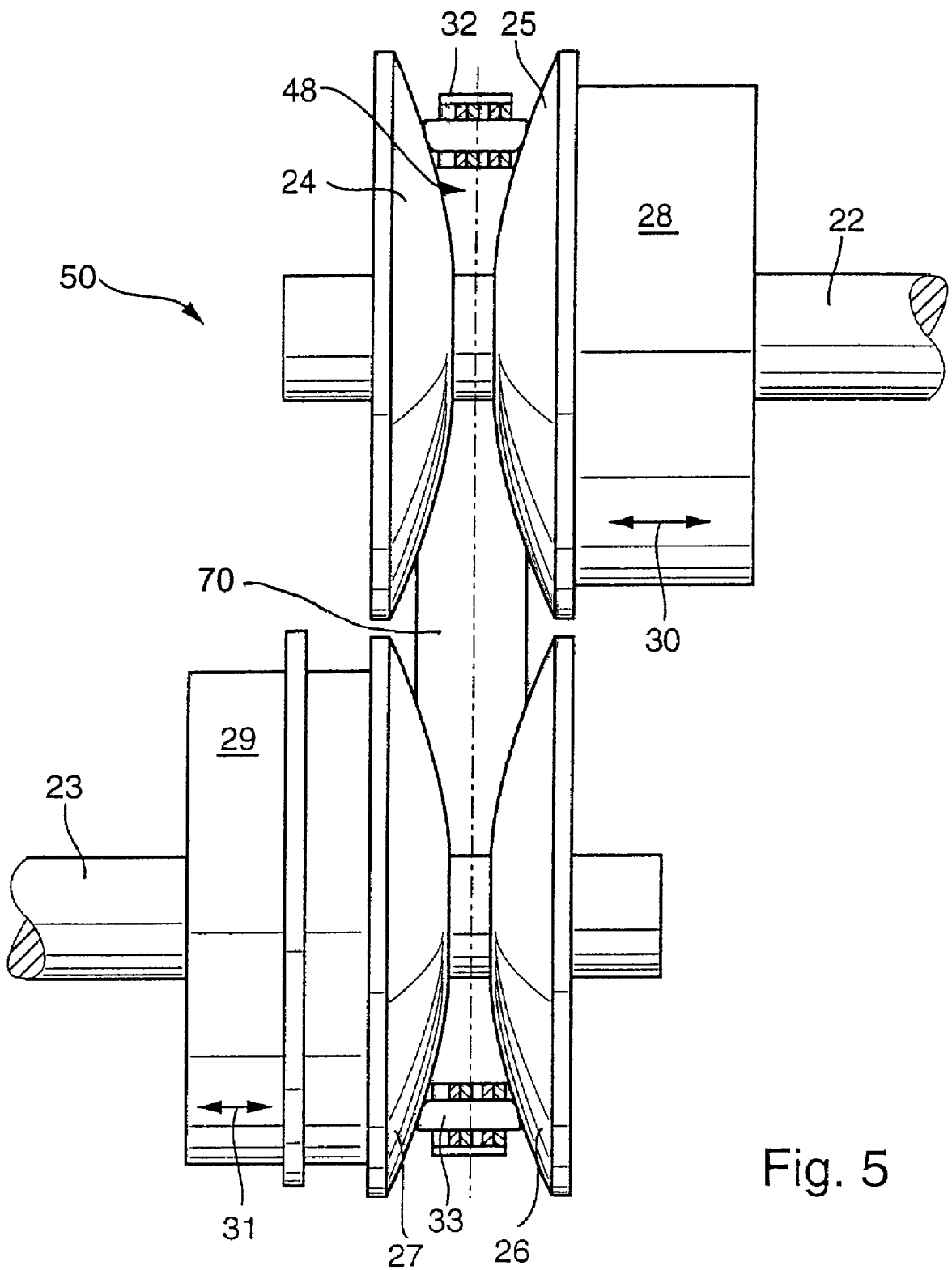
FIG. 5 is a schematic representation of an apparatus for extending a plate-link chain.

FIG. 5 shows an arrangement 50 to stretch a plate-link chain 32 in accordance with the invention, whereby the plate-link chain 32 is received in a conical disk gap 48 between two sets of conical disks. The arrangement of FIG. 5 can, however, also act as a loop-driven conical pulley transmission, which in operation includes a chain in accordance with the invention. One set of conical disks is formed by the two conical disks 24 and 25 that are axially displaceable relative to each other. The one conical disk 25 is axially movable, see arrow 30. The adjusting cylinder 28 serves to axially displace the chain and to press it against the set of conical disks.

The other set of conical disks is formed from the two conical disks 26 and 27 that are axially displaceable relative to each other. For that purpose one conical disk 27 can be shifted axially, see arrow 31. The adjusting cylinder 29 serves to axially displace the chain and to press it against the set of conical disks. The rotational speed and/or the torque can be adjusted by the input side shaft 22 and the output side shaft 23.

According to another embodiment of an apparatus for stretching a plate-link chain, it can be advantageous for the axes or shafts of the apparatus to be pulled away from each other by the application of a force, so that the plate-link chain is forced into the conical-disk gap and so the power transmission between the plate-link chain and the conical disks can be set at the desired value. In addition, it is not absolutely necessary that the conical disks of the pairs of conical disks be axially displaceable relative to each other. It can also be suitable that the conical disks are rigidly affixed to each other.

When stretching the chain in the loop direction after assembly, the individual links of the plate-link chain will be tight against the rocker members. Thereafter it will be placed in a variable speed unit, for example in accordance with FIG. 5. The chain is stretched in the loop direction by the compression between the rocker members and the conical disks and/or by torque transmission. In addition, there will be set a multiple of the pressing forces and torques that normally appear in a transmission, and the chain will be allowed, for example, to run through the variable speed unit with fewer revolutions, so that each chain link, such as plate links and rocker members, passes around the variable speed unit at least once or several times. It is advantageous for the chain to be rotated slowly and with fewer revolutions, compared with the conditions in a motor vehicle transmission.

Typically the stretching process can be carried out in the starting gear ratio (underdrive), whereby the torque of the variable speed unit is adjustable within the range of from zero to ten times the nominal torque, that is, the maximum torque that occurs in the transmission. In particular, a torque in the range of approximately three times the maximum moment of the variable speed unit is set. It is also appropriate that the tension in the strand 70 is larger during the stretching process than during operation of the transmission. Advantageously, the tension is at least twice the maximum tension during normal transmission operation.

The plate-link chain is then rotated at a low rotational speed in the range of about 0.5 revolutions per minute to about 500 revolutions, advantageously from about 10 revolutions per minute to 50 revolutions per minute, over several revolutions or passes. It can be appropriate depending upon the plate-link chain to perform 1 to 20 revolutions.

In accordance with the invention, the transmission ratio can also be changed during the stretching process.

In that way the load distribution is set in a manner corresponding substantially with underdrive (starting gear ratio) in the vehicle. During one stretching process, however, another transmission ratio can also be set during the stretching process, such as, for example, an overdrive transmission ratio or a variable transmission ratio. The advantage of the stretching process in the wrap-around member is that the chain is stretched substantially at each bend of the chain that occurs during operation, and as a result the load distribution is similar to the actual load distribution during operation of the transmission.

As a result of the stretching process in the wrap-around member, and on the basis of the contact pressure and/or the torque loading of the chain that is loaded in that manner, the rocker members, considered relative to the shaft of the set of disks, are elastically deformed or bent in the radial direction as well as in the circumferential direction. As a result, considered over the width of the chain, the outwardly-disposed plate links are more heavily loaded than the plate links disposed in the middle of the chain. That has the result that the outer plate links or those plate links disposed on the edge are more greatly elongated than the plate links disposed inwardly, and those outer plate links experience a higher degree of stretching than the inner plate links. By the degree of stretching is meant the condition between the loading by stretching and the condition of ultimate load.

Moreover, it can be appropriate, for the plate links of one plate-link row which when assembled have the same length, for those plate links to be elongated differently as a function of the width.

Likewise, it can be appropriate for the plate links of one plate-link row when assembled to already exhibit different lengths and plate-link opening inner widths, respectively, so that the plate links disposed at the edge of the chain exhibit a larger plate-link opening inner width than the middle plate links. That can be especially appropriate when stretching is not of the loop member, but, on the contrary, the plate links are stretched before assembly and the plate links are thereafter assembled together to form a chain. Then one can, on the basis of the assembly of the plate links having different plate-link inner widths, construct a chain that already has at its edges longer plate-link inner widths than in the middle. That is shown in exemplary form in FIG. 12. There it is shown that the plate-link inner width as a function of the position of the plate links is greater at the edge than in the middle. That can result both from the stretching process in the loop member as well as from the assembly of different length plate links in accordance with the invention.

The plate links that are stretched by a stretching process before assembly can be stretched with different degrees of stretch, and during assembly they can be constructed in such a way that the plate links with a higher degree of stretching are arranged at the edge of the chain. That has the result that the outer plate links or those plate links arranged at the edge are more highly plasticized and loaded than the inwardly-arranged plate links, and those outer plate links experience a higher degree of stretch than the inner plate links. That is shown in exemplary form in FIG. 11. There it is shown that the degree of stretching as a function of plate link position is greater at the edges than in the middle area. That can result both through the stretching process of the loop member and also through the assembly of various highly-stretched plate links in accordance with the invention.

Figure 6:
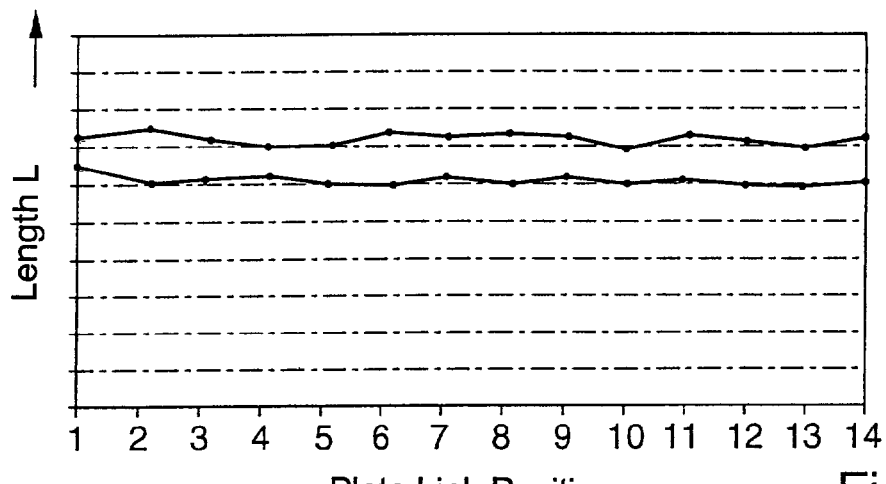
FIG. 6 is a graph showing relative plate link length as a function of width-wise position of the links for an unstretched chain.
Figure 7:
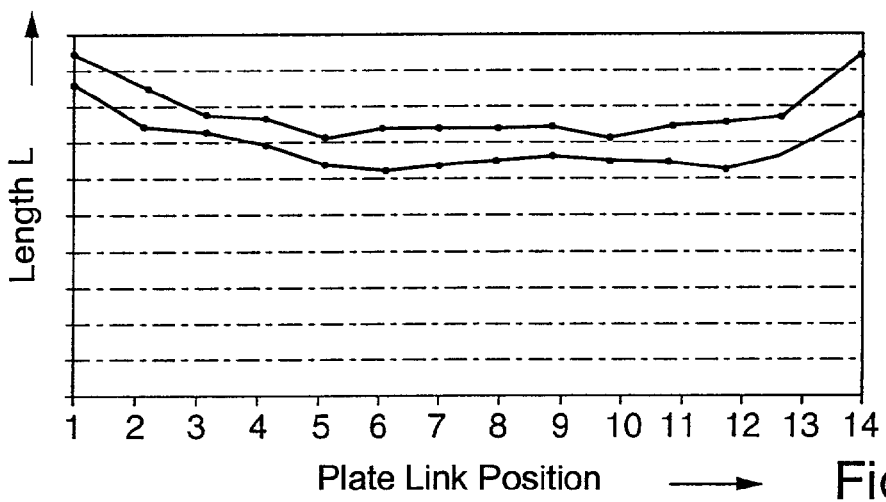
FIG. 7 is a graph showing relative plate link length as a function of width-wise position of the links after stretching of a chain.
Figure 8:
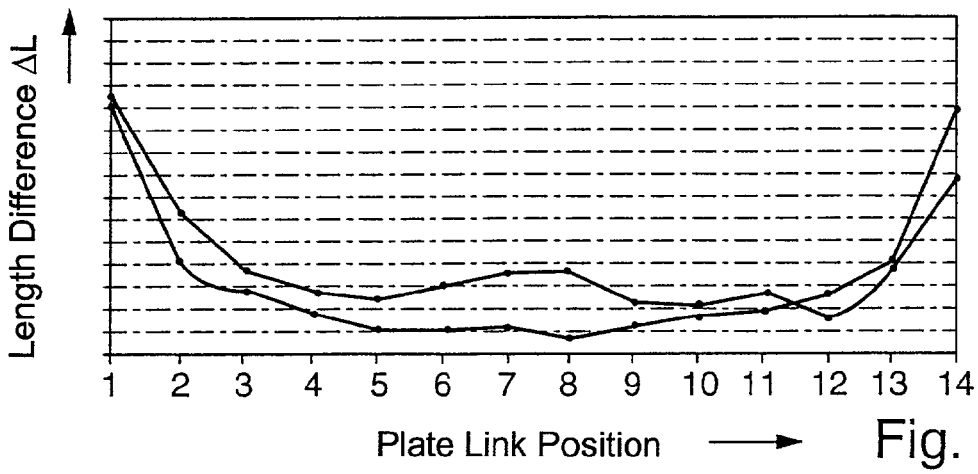
FIG. 8 is a graph showing relative change of plate link length as a function of width-wise position of the links for a dynamically stretched chain.

FIGS. 6 through 8 show in graphs the condition of the lengths of the plate links considered as a function of their disposition across the width of the chain. On the y-axes of FIGS. 6 and 7 are shown the lengths of the plate links and the length of the spacing L between both contact areas of one plate link, respectively. The length L also represents the plate link opening inner width. In FIG. 8 is shown the length difference ΔL of the plate links between an unstretched and a stretched condition in accordance with the invention. Shown along the x-axes of each of FIGS. 6 through 8 is the position of the plate links across the width of the chain. Position 1 corresponds with the position of the plate link on one side of the chain and position 14 corresponds with the position of the plate link on the other side of the chain. Positions 2 through 13 correspond with the plate link positions between the edge plate links 1 and 14. Thereby there is shown specifically a chain with 14 plate link positions across the width of the chain as an illustrative embodiment, though other chain variations can also be included without restrictions on generality.

FIG. 6 shows a graph of an unstretched chain or a stretched open chain in straight condition. The length L as a function of the plate link position 1 through 14 is substantially equal and constant.

FIG. 7 is a graph of a chain that has been dynamically stretched in the wrap-around, closed condition. The length L variation is a function of the plate link position 1 through 14, whereby the edge plate links in positions 1 through 3 and 12 through 14 are more highly stretched than the plate links at the middle plate link positions 4 through 11. This result is based on the radial and circumferential bending of the rocker members and the corresponding high plastic deformation of the contact areas of plate links that are disposed at positions at the edge or near the edge.

FIG. 8 is a graph of a chain that has been dynamically stretched in the wrap-around, closed condition. The length difference ΔL variation is a function of the plate link positions 1 through 14, whereby the edge plate links in positions 1 through 3 and 12 through 14 are more highly stretched than the plate links at the middle plate link positions 4 through 11. This result is based on the radial and circumferential bending of the rocker members and the corresponding plastic deformation of the contact areas of plate links that are disposed at the edge or near the edge. The presentation in FIG. 8 clearly illustrates once again the inventive effect to increase the efficiency of the chain.

The small fluctuations in the length L, that is, in the elongation ΔL in the middle area results from measurement errors.

The elongation of the plate links during the stretching process produces a plastic deformation of the plate links in the contact areas between the plate links and the rocker members.

Through the particularly radially- and/or circumferentially-directed bending of the rocker members there results a plate link plastic deformation, which accommodates the angle between the movement direction and the rocker member.

Figure 9:
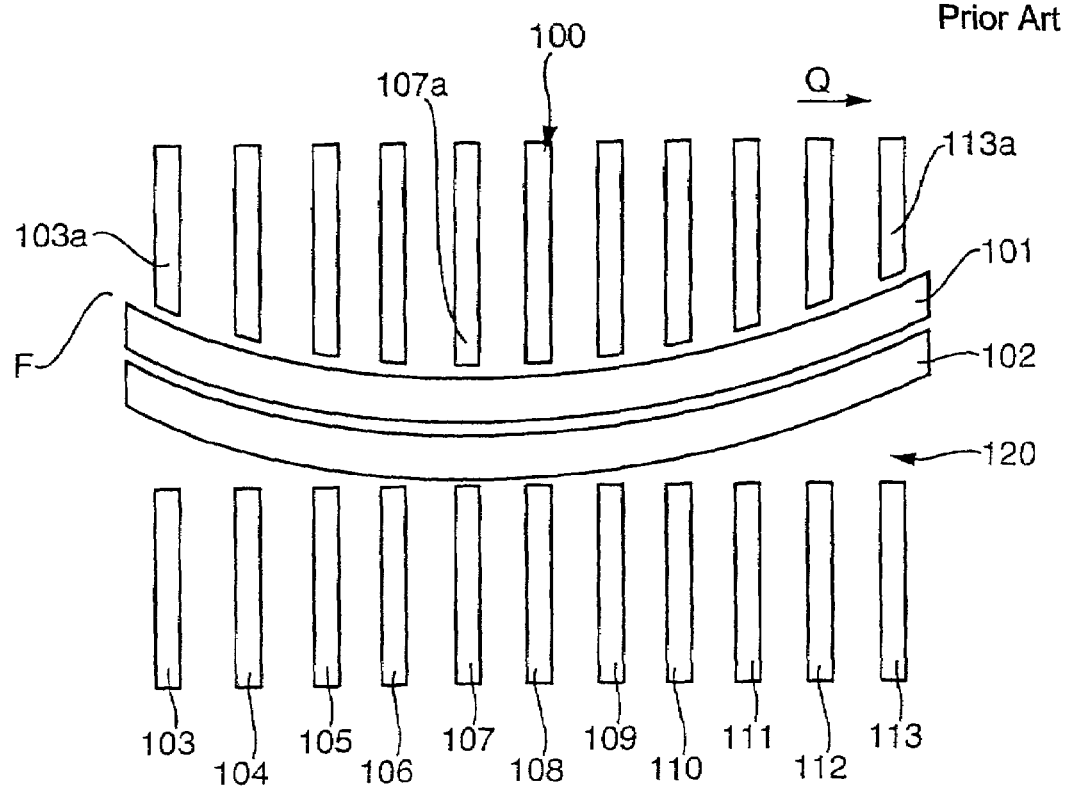
FIG. 9 is a representation of the extension of links.

FIG. 9 shows a section of a chain 100 with rocker members 101 and 102, which are received in clearances 120 of the plate links 103 through 113. The rocker members are represented as bent in the manner that they can be bent in a dynamic stretching process in the wrap-around mode, such as, for example, in the disk wedge. The representation is for clarification and is of course a somewhat exaggerated representation.

Figure 9A:
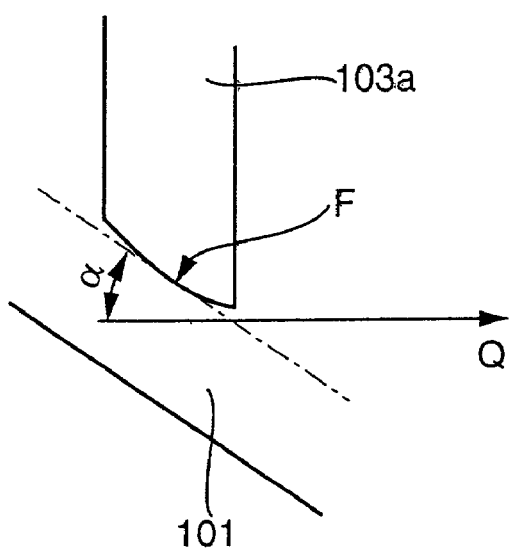
FIG. 9a is a cutaway portion of FIG. 23.
Figure 9B:
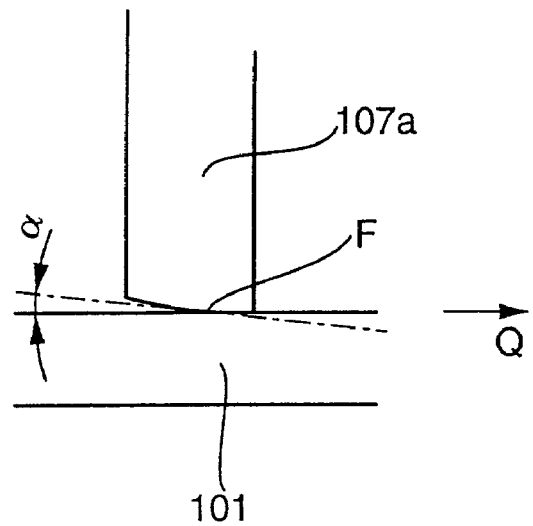
FIG. 9b is a cutaway portion of FIG. 23.

The contact areas 103a through 113a are plastically deformed by the bending of the rocker members 101 and 102 and match their contour with that of the rocker members. It is shown that the outer plate links are more severely elongated and the plastic deformation leads to a larger angle α between the chain transverse direction Q and the contact surface F than at a middle plate link such as, for example, 107. FIG. 9a and FIG. 9b each show a cutaway portion.

The angle α increases moving from the middle of the chain to the outside.

Figure 10:
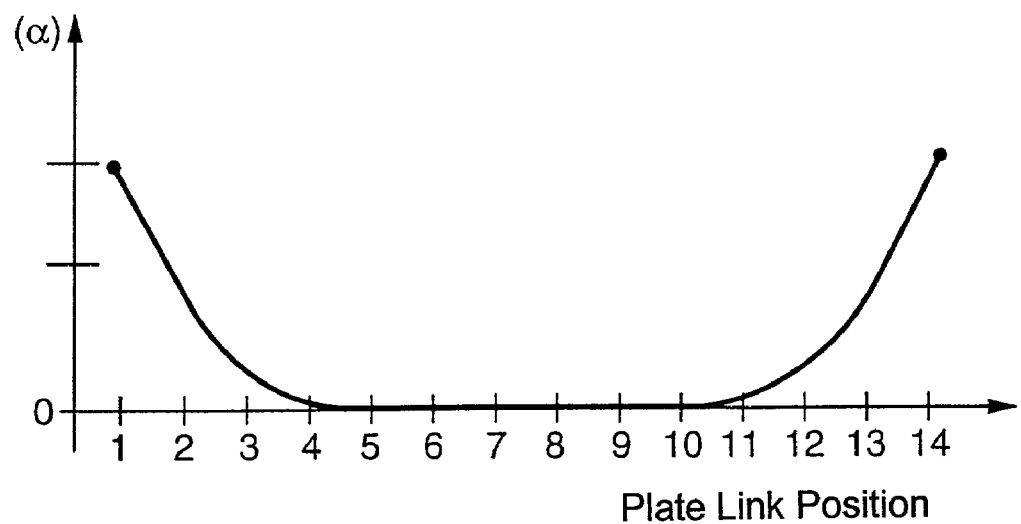
FIG. 10 is a graph of contact area angle as a function of width-wise position of the links.

FIG. 10 shows a graph in which the angle α is shown as the value |α| represented as a function of the plate link position. The angle increases outwardly toward the edges and returns to zero at the middle area. That can be achieved in accordance with the invention by stretching the loop member or, suitably by a further object of the invention, also by stretching the plate links in such a way before assembly, in which they are stretched to different angles α and are subsequently mounted together to a chain.

Figure 11:
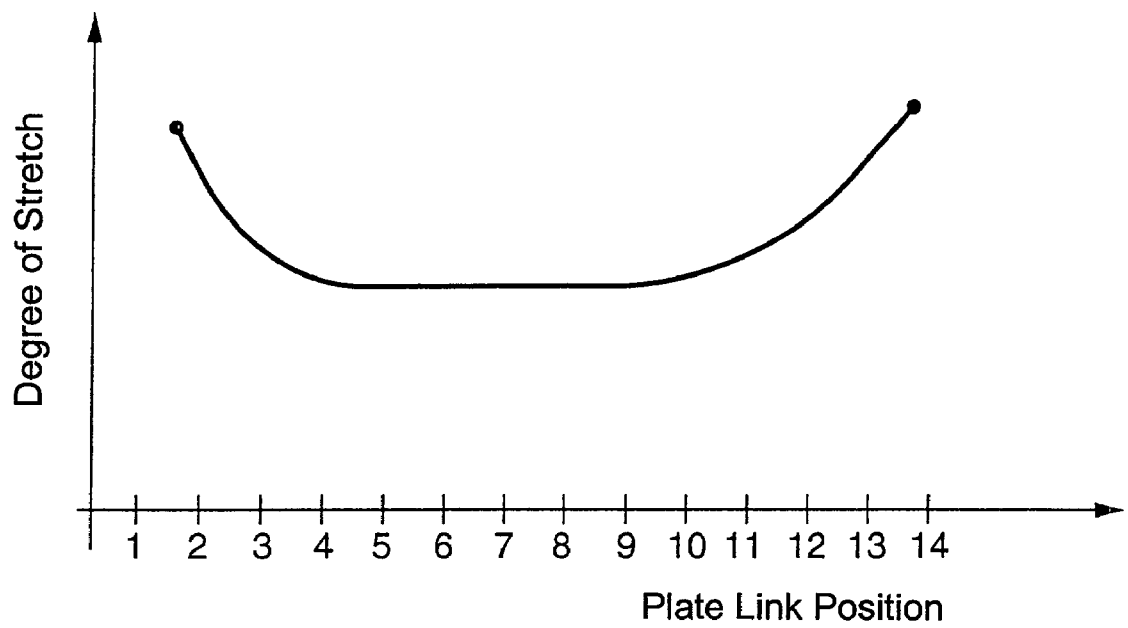
FIG. 11 is a graph of degree of stretch as a function of width-wise position of the links.
Figure 12:
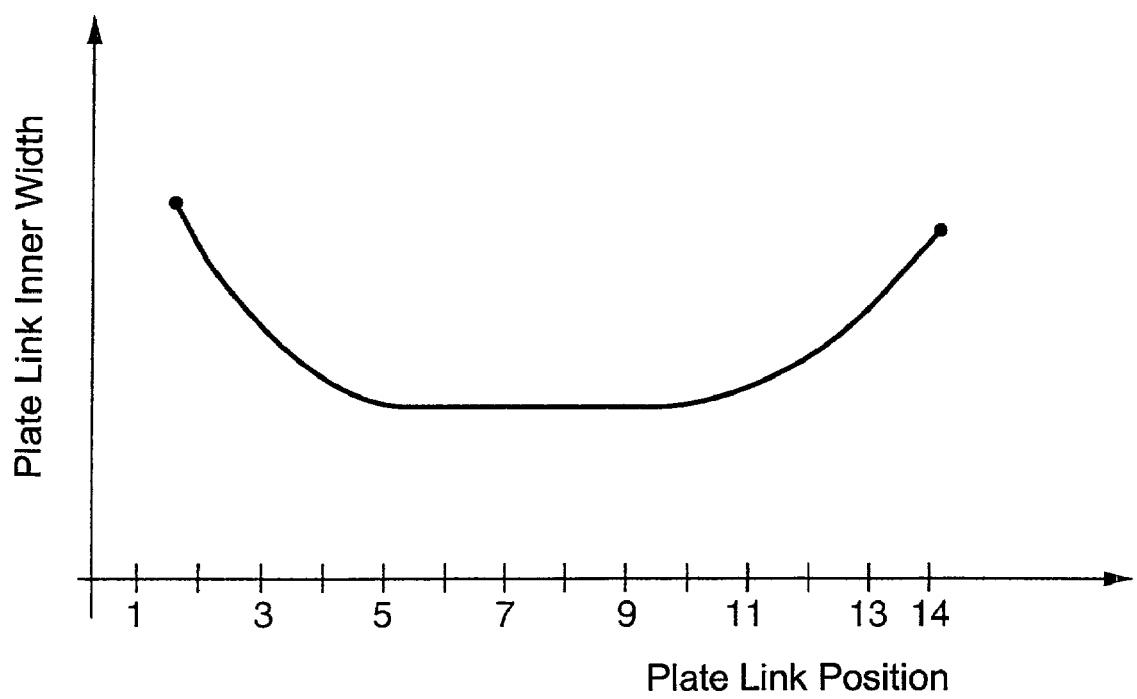
FIG. 12 is a graph of plate link inner width as a function of width-wise position of the links.

FIGS. 11 and 12 show that degree of stretch of the plate links, and the plate link inner width, respectively, as a function of width-wise plate link position.

The plates near the edge are more highly loaded by the stretching in accordance with the invention than by a stretching process on a straight strand. Thereby the plate links at the edge are more highly elongated and the degree of stretch is higher.

Through the proper stretch loading of the chain by the stretching process the chain will be preconditioned in such way that during later operation of the chain in a transmission the loading will be equalized and the chain will therefore experience a longer service life.

Furthermore it is advantageous, for thereby reducing the loading on the chain, that the force introduction by the rocker members to the link elements, by a two-area contact 80, 81 in conformance with FIG. 2, be equalized in both areas. Regarding that, reference is particularly made to German patent application DE 30 27 834, the contents of the disclosure of which expressly forms part of the content of the foregoing application.

Figure 13:
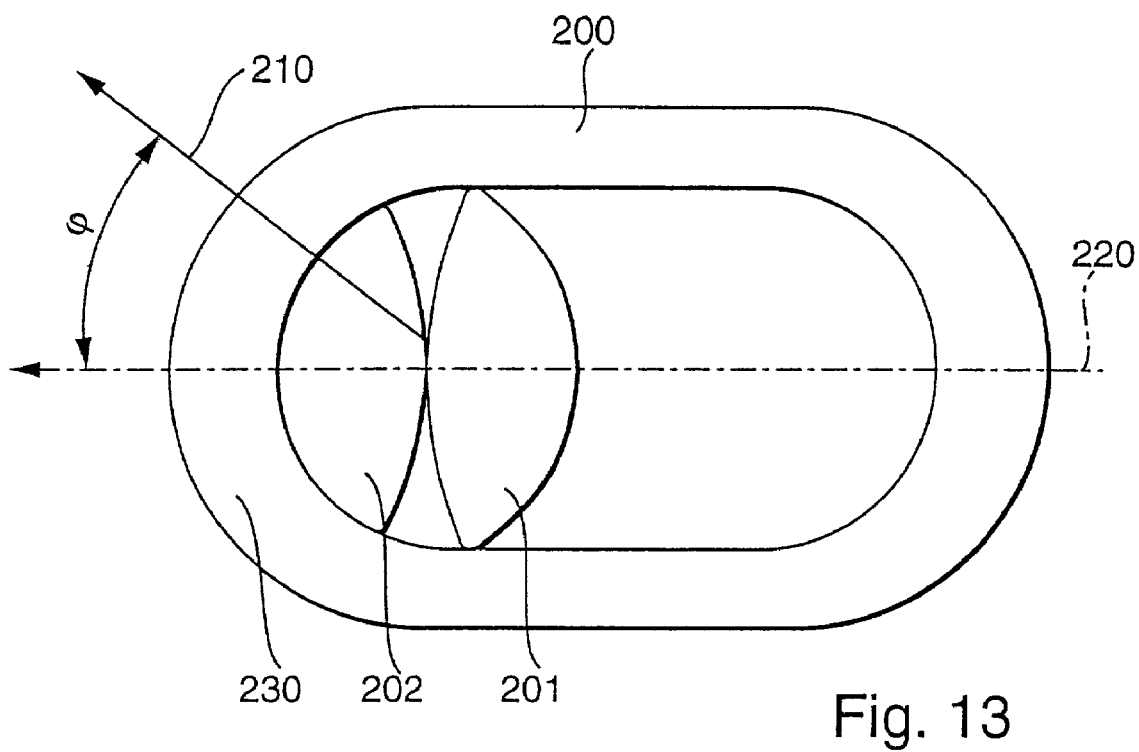
FIG. 13 is a view of a link.

FIG. 13 shows a detail of a plate link 200 with rocker members 201 and 202, wherein the plate link is stretched in such a way by a stretching process that the force introduction of the stretching force 210 is oriented at an angle φ to the plate link, that is, to the chain length direction 220. During a stretching operation the angle φ will be varied so that it extends from about 60 degrees to about −60 degrees, so that the contact areas 230 will be stretched and plastically deformed over a wide angular range.

Figure 14:
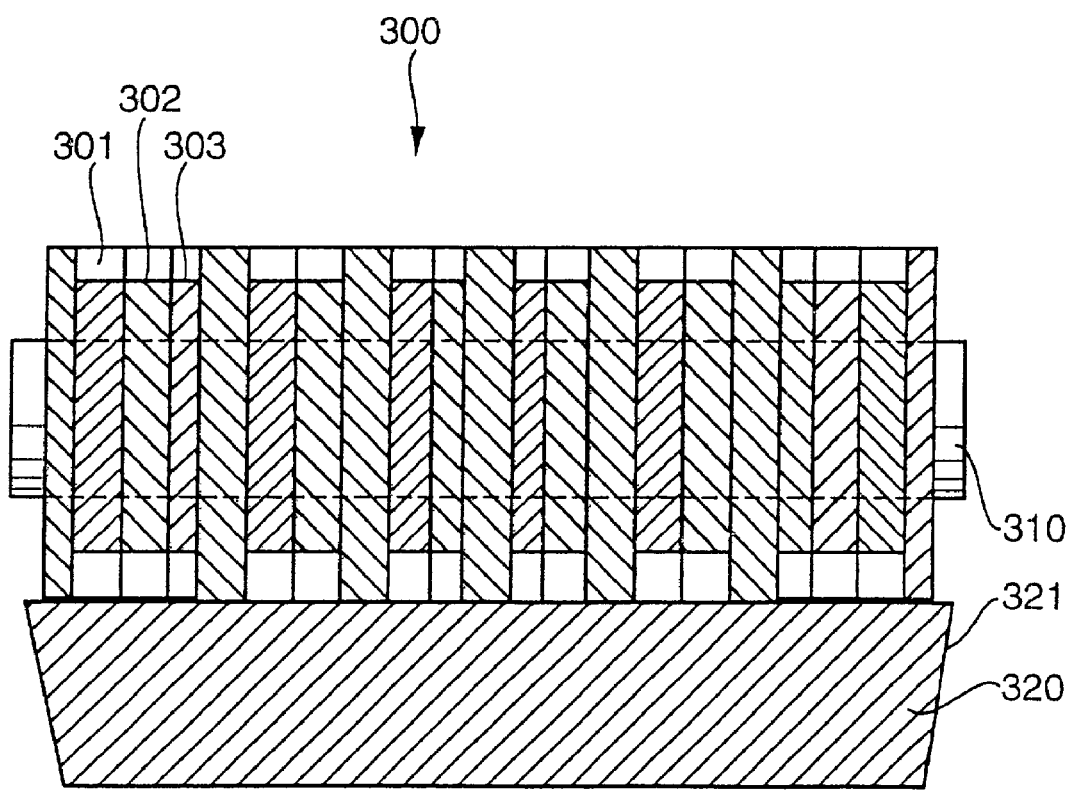
FIG. 14 is a plate-link chain in section.

FIG. 14 shows a plate-link chain 300 in section, in which next to the plate links 301, 302, 303 and the rocker members 310 there exist cross pins 320 as a hinge for torque transmission between the conical disks and the chain. The frictional force transmission results from the end faces 321 of the cross-pins.

The claims included in the application are exemplary and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A plate-link chain for a conical disk transmission having a steplessly adjustable transmission ratio, said chain comprising: a plurality of interconnected chain links to define a multiple-link chain, individual chain links of which are formed from plate link sets that are connected as pairs by rocker members that are inserted into openings in the plate links and that have rocker faces that are supported against each other for relative rolling movement, wherein the plate-link openings have a different plate-link opening inner width based upon the position of a link in the direction of the chain width, wherein the plate-link openings initially have equal plate-link opening inner widths and are produced by a stamping process, and wherein the stamped plate links are stretched to provide plate links having different opening inner widths and are assembled together with respective rocker members to provide the chain links.

2. A plate-link chain in accordance with claim 1, wherein inner surfaces of the openings in the plate links have a different angle between contact areas of the rocker members with the plate links and an axis that is oblique when viewed relative to the chain longitudinal direction.

3. A plate-link chain in accordance with claim 1, wherein at least one conical-disk-facing end face of the rocker members per link transmits frictional force between the conical disks and the plate-link chain.

4. A plate-link chain in accordance with claim 1, wherein the chain includes connecting pins that transmit frictional forces between the conical disks and the plate-link chain.

5. A plate-link chain in accordance with claim 1, wherein plate links adjacent to an edge of the plate-link chain are more highly elongated than plate links arranged in the middle of the plate-link chain.

6. A plate-link chain in accordance with claim 1, wherein contact areas of the plate links with the rocker members are plastically deformed by a link stretching operation so that an angle is formed between contact areas of the plate links with the rocker members and a direction oblique to the longitudinal direction of the chain.

7. A plate-link chain in accordance with claim 6, wherein the contact areas of the plate links adjacent to edge of the plate-link chain are more highly deformed than those of plate links arranged in the middle of the plate-link chain.

8. A plate-link chain in accordance with claim 7 wherein the contact areas of the plate links viewed across the width of the chain define a curved shape.

9. A plate-link chain in accordance with claim 8, wherein the curved shape is defined by an $n^{th}$ degree polynomial.

10. A plate-link chain in accordance with claim 1, wherein the plate-link chain is received in conical disk gaps between two conical disk pairs and is impacted by torque applied to at least one conical disk pair.

11. A plate-link chain in accordance with claim 10, wherein the plate-link chain is stressed by applying an axial load through pressing together of the conical disks.

12. A plate-link chain in accordance with claim 11, wherein individual conical disks of the conical disk pairs are movable relative to each other.

13. A plate-link chain in accordance with claim 10, wherein the impacting torque applied during a stretching process is substantially greater than the nominal operating torque applied to the chain during operation of a transmission equipped with a plate-link chain.

14. A plate-link chain in accordance with claim 10, wherein the impacting torque during the stretching process is in the range between zero and ten times a nominal torque during operation of a transmission equipped with a plate-link chain.

15. A plate-link chain in accordance with claim 14, wherein a pulling force applied to the chain during the stretching process is greater than a nominal pulling force applied to the chain during operation of a transmission equipped with a plate-link chain.

16. A plate-link chain in accordance with claim 14, wherein the impacting torque is from about three times to about five times the nominal torque.

17. A plate-link chain in accordance with claim 10, wherein the plate-link chain is stressed by applying to the chain an axial load by drawing apart the axes of the conical disk pairs.

18. A plate-link chain in accordance with claim 1, wherein the plate-link opening inner widths in a longitudinal direction of the chain are progressively larger for plate links at laterally outer link positions of the chain.

19. A plate-link chain for a conical disk transmission having a steplessly adjustable transmission ratio, said chain comprising: a plurality of interconnected chain links to define a multiple-link chain individual chain links of which are formed from plate link sets that are connected as pairs by rocker members that are inserted into openings in the plate links and that have rocker faces that are supported against each other for relative rolling movement, wherein the plate-link openings have a different plate-link opening inner width based upon the position of a link in the direction of the chain width, and wherein the different plate-link opening inner widths are provided by stretching previously-formed plate links before assembly into individual chain links.

20. A plate-link chain in accordance with claim 19, wherein the plate links have a different degree of stretch as a function of plate-link position across the chain width.

21. A plate-link chain in accordance with claim 20, wherein the plate links are produced by a stamping process and are assembled together with rocker members to form a chain.

22. A plate-link chain in accordance with claim 21, wherein the plate-link opening inner widths of the plate links are equal before the plate links are stretched.

23. A plate-link chain in accordance with claim 21, wherein the plate-link opening inner widths of the plate links are different before the plate links are stretched.

24. A plate-link chain in accordance with claim 19, wherein the plate-link opening inner widths in a longitudinal direction of the chain are progressively larger for plate links at laterally outer link positions of the chain.

* * * * *